Aug. 1, 1961 D. W. COLLIER ET AL 2,994,746

AUTOMATIC RECORDING MACHINE

Filed Sept. 19, 1957 3 Sheets-Sheet 1

INVENTORS
Donald W. Collier
William G. Whitney
Neal T. Williams
By: George H. Fritzinger
Agt.

INVENTORS
Donald W. Collier
William G. Whitney
Neal T. Williams
By: George H. Fritzinger
Agt.

AUTOMATIC RECORDING MACHINE

Filed Sept. 19, 1957 3 Sheets-Sheet 3

INVENTORS
Donald W. Collier
William G. Whitney
Neal T. Williams
By George H. Fritzinger
Agt.

2,994,746
Patented Aug. 1, 1961

2,994,746

AUTOMATIC RECORDING MACHINE

Donald W. Collier and William G. Whitney, Wayne Township, Passaic County, and Neal T. Williams, Bloomfield, N.J., assignors to McGraw-Edison Company, Elgin, Ill., a corporation of Delaware Filed Sept. 19, 1957, Ser. No. 684,903
9 Claims. (Cl. 179—100.2)

This invention relates to a machine for recording dictation or other matter of discontinuous nature along successive side-by-side tracks or convolutions on a record medium, and particularly it relates to an automatic form of magnetic dictating machine which does not require manual controls.

The process of recording dictation is typically an intermittent one wherein the dictator stops the machine frequently to prevent waste of record space while he develops the further run of his thoughts. All dictating machines have therefore been provided with some convenient form of hand or foot control for starting and stopping the machine.

The present invention takes advantage of the fact that in recording on a magnetic medium the recording head may traverse repeatedly a track on the record medium without damaging or wearing the same to any appreciable extent. The purpose of the invention is to provide the machine with a continuously-operating drive mechanism and with an automatic backspacing means controlled according to the continuity of the signals recorded on the record for backspacing the recording head, whenever there has been an absence of recorded signal for a predetermined interval, to substantially the place which the head occupied on the record when the cessation of signal began. In so doing the machine can be left to run continuously and full recording is made of all dictation spoken into the microphone regardless of whether the dictation is continuous or not without producing any appreciable waste space on the record of a length greater than that corresponding to said predetermined no-signal interval. If feed of signals into the machine is resumed when only a portion of such interval has elapsed, the backspacing is delayed and the waste space on the record is correspondingly reduced.

An object of the invention is to provide a recording machine free of manual controls and capable of making efficient utilization of record space while recording matters of interrupted character.

Another object is to provide such automatic machine having improved operating means permitting the elimination of the usual start-stop mechanism.

Another object is to provide such automatic machine having a continuously-operating drive mechanism and means for backspacing the recording head to its last prior position of recording after each predetermined interval during which no signal is fed to the machine.

Another object is to return the head carriage automatically by means controlled by the record itself as a record is changed in the machine.

These and other objects and features of our invention will be apparent from the following description and the appended claims.

In the description of our invention reference is had to the accompanying drawings, of which:

Figure 2:
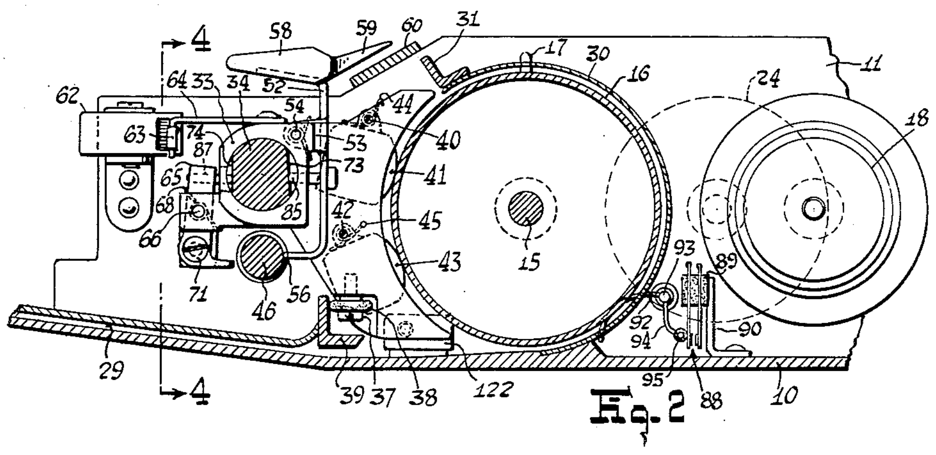
FIGURE 2 is a vertical sectional view taken substantially on the line 2—2 of FIGURE 1.

The dictating machine shown in the figures has a base plate 10 provided with left and right side standards 11 and 12. In these standards are bearings 13 and 14 for a transverse shaft 75 on which a drum 16 is mounted for carrying a flexible magnetic sheet record in wrap-around relation thereto, the drum 16 having for this purpose radial drive pins 17 at its ends for engaging corresponding drive holes in leading corner portions of the sheet record whereby to propel the sheet record with the drum as the drum is advanced in a counterclockwise direction as it appears in FIGURE 2. Rotation of the drum 16 is provided by a drive motor 18 mounted on the left standard 11 and having a drive pulley 19 coupled by a belt 20 to a large intermediate pulley 21 of a speed reduction system. The pulley 21 is freely journaled on an end portion of the drum shaft 15 and has integral therewith a relatively small pulley 22 which is in turn coupled by a belt 23 to a large intermediate pulley 24. The pulley 24 is journaled on a stud 25 mounted on the standard 11, and has a small pulley 26 secured thereto which is coupled by a belt 27 to a large pulley 28 fastened to the end of the drum shaft 15. By this speed reduction system the drum 16 is rotated at a speed of about one revolution every three seconds. Such drum may further have an outside diameter of approximately 1.9" to provide a peripheral record speed of 2" per second.

The mounting of a sheet record on the drum 16 may be carried out by inserting the record, leading edge first, through a slot 29 to a position below the drum 16 whereat the drive pins 17 will engage the drive holes of the sheet record and cause the record to be attached to the drum as the drum is advanced. In order to confine the sheet record in close peripheral relation to the drum 16, an arcuate guide plate 30 is provided around the back side of the drum in spaced relation thereto from the end of the guide slot 29 to the front of the machine whereat the guide plate 30 is secured to a transverse angle iron 31 supported at its ends by the side standards 11 and 12. The termination of the guide plate 30 at the front of the machine is for the purpose of providing access to the mounted record for the translating heads hereinafter described.

At the front of the drum 16 there is a carriage 32 having a long bearing 33 slidably mounted on a transverse support rod 34. As will appear, this support rod serves also as a cam shaft for controlling the backspacing mechanism. The rod 34 is mounted rotatably at its ends in the side standards 11 and 12 and is located lengthwise thereof by collars 35 fastened to the end portions thereof. The carriage has two vertical fins 36 extending rearwardly therefrom and spaced lengthwise thereof. Journalled on a stud 37 threaded into one of these fins is a horizontal guide roller 38 which rides against an angle iron 39 extending crosswise of the machine and supported at its ends by the side standards 11 and 12. By this means the carriage 32 is held from turning on the support rod 34. Pivotally supported between the fins 36 on an upper pair of cone pivots 40 is an erase head 41, and on a lower pair of cone pivots 42 is a combination record-reproduce head 43. These heads are biased rearwardly against the drum 16 by respective torsion springs 44 and 45 with the reaction force on the carriage being taken up by the guide roller 38 and angle iron 39. The magnetic heads 41 and 43 have narrow pole pieces separated by air gaps as in accordance with usual practice. The gap of the erase head 41 is positioned in advance of the record portion of the head 43 to erase any prior recording on the record as the recording operation proceeds.

Below the support rod 34 in parallel relation thereto is a feed screw 46 which is journaled at its ends in the side standards 11 and 12. Between this feed screw and the drive shaft 15 is a gear train 47 comprising a gear 48 secured to the pulley 28, an intermediate gear 49 journaled on a bracket 50 secured to the left side standard 11, and a gear 51 secured to the left end portion of the feed screw 46. By this coupling the feed screw 46 is driven in fixed timed relation with the drum 16. At the back side of the carriage 32 there is a vertical lever 52 provided with ears 53 which pivot on a cross pin 54 supported between the right one of the fins 36 and a lug 55 at the right end of the bearing 33. This lever has a right-angle lower end portion terminally notched at 56 to form a feed pawl. This feed pawl engages the feed screw 46 under pressure of a torsion spring 57 to advance the carriage as the drum is rotated. This lever 52 may extend upwardly to the top of the machine and have there a fingerpiece 58 by which the feed pawl 56 may be disengaged from the feed screw 46 and the carriage then shifted manually along the drum, but as will appear such manual release of the feed pawl 56 is not contemplated in a normal use of the machine. Further, the lever 52 may have a pointer 59 or other indexing element at its upper end which may overlie a scale or index slip 60 provided at the top of the machine along the drum.

Figure 4:
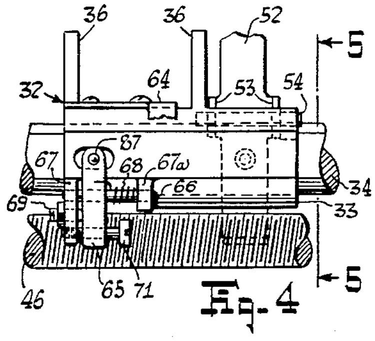
FIGURE 4 is a front view ofthe carriage and related components as seen from the line 4—4 of FIGURE 2.

The carriage 32 is subjected constantly to a return force by a coil spring 61 provided in the circular housing 62 mounted on the left standard 11. This spring leads out from the housing and is connected at 63 to a forwardly-extending arm of a bracket 64 secured to the top of the carriage 32. In order that each backstepping of the carriage 32 will be for a limited distance under influence of the return spring 61, the carriage is provided at the front thereof with a stop pawl 65 for engaging the feed screw 46. This stop pawl is pivoted on a cross pin 66 supported between two forwardly-extending lugs 67 and 67*a* on the carriage. These lugs are spaced apart sufficiently to permit a shifting of the top pawl 65 lengthwise of the carriage. Coiled about the pin at the right side of the pawl 65 is a compression spring 68 having its ends hooked on the pawl 65 and carriage 32 respectively to hold the pawl disengaged from the feed screw. This compression spring also normally holds the pawl 65 at its most leftward position defined by its abutment against a stop screw 69 threaded rightwardly through the left lug 67 (FIGURE 4). In the lower portion of the pawl there is a clearance hole 70 through which extends a headed stop screw 71 that is threaded leftwardly through a lower end portion of the lug 67. This headed stop screw determines the most rightward position of the shiftable stop pawl 65.

The feed and stop pawls 56 and 65 are operated and controlled by means of the shaft 34 for backstepping the carriage 32. For this purpose the shaft 34 has a relatively large flat 73 lengthwise thereof to provide a cam for controlling the feed pawl 56 and has a nearly opposite and smaller flat 74 as well as a groove 75 both running lengthwise of the rod to provide cams for controlling the stop pawl 65. The rod 34 extends through the right standard 12 and has a pinion gear 76 secured thereto which meshes at one side with a sector gear 77 of a rotary solenoid 78 and at the other side with a sector gear 79 of a rotary solenoid 80. The sector gear 77 is journaled on a central stud 78*a* of a drive disk 81 of the solenoid 78 and has a lost-motion coupling to this disk provided by a pin 82 on the disk extending through an arcuate slot 82*a* in the sector gear. On the other hand, the sector gear 79 is secured rigidly to the shaft of the solenoid 80. The rotary solenoid 78 has a drive range of the order of about 22° and the solenoid 80 has a suitably greater drive range of the order of about 30°. The two gears 77 and 79 are held yieldably in the rotational positions which they occupy in FIGURE 3 by means of a tension spring 83 connected to the gear 77 and a stop pin 84 defining the end position of the gear 79. In this initial positioning of the gears the rod 34 is positioned with its flat 73 in registration with a pin 85 on the feed pawl 56—which pin extends through a clearance hole 86 in the carriage—to cause the feed pawl 56 to engage the feed screw 46 under influence of the torsion spring 57. At the same time a pin 87 on the upper end of the stop pawl 65 engages the flat 74 on the rod 34 to cause the stop pawl 65 to be disengaged from the feed screw 46 under influence of its torsion spring 68. These are the conditions for providing a progressive advance of the carriage during rotation of the drum 16.

Figure 3:
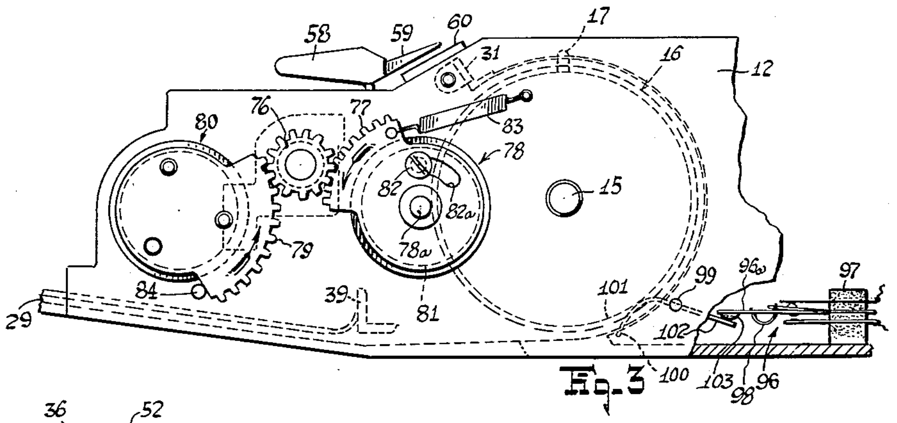
FIGURE 3 is a fractional righthand view of the machine shown in FIGURE 1.
Figure 5:
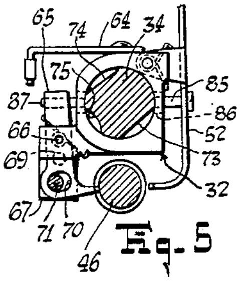
FIGURE 5 is a fractional sectional view taken on the line 5—5 of FIGURE 4 but showing the backspacing mechanism operated for backspacing the carriage by one step.

When the rotary solenoid 78 is activated it turns the shaft 34 clockwise as it appears in FIGURE 3 to cause the following to occur in the sequence here named: (1) the pin 87 is cammed outwardly onto the periphery of the shaft 34 to engage the stop pawl 65 with the feed screw 46 as indicated in FIGURE 5, and (2) the pin 85 is cammed outwardly also onto the periphery of the rod 34 to disengage the feed pawl 56 from the feed screw 46. When the latter occurs the carriage 32 is snapped back by the return spring 61 with forward shifting of the stop pawl 65 relative to the carriage until the pawl abuts against the head of the stop screw 71. In this connection the stop screw 69 is set so that in operation (1) the pawl 65 will come into substantially full alignment with the threads on the feed screw 46 and the stop screw 71 is set so that the backstepping of the carriage 32 is nearly precisely the distance of two full track convolutions on the record. Upon the solenoid 78 being next deenergized, the rod 34 is returned by the spring 83 to produce the reverse sequence of operations—i.e., the feed pawl 56 is reengaged with the feed screw 46 and the stop pawl 65 is next disengaged from the feed screw 46 and thereupon shifted backwardly against the stop screw 69.

The solenoid 78 is controlled by a series of switches hereinafter described, one of which is a switch 88 controlled according to whether a record is mounted on the drum 16. This switch has two blades mounted in an insulating stack 89 supported by a bracket 90 on the base 10. In the left end portion of the drum 16 there is a peripheral groove 91 engaged obliquely by a curved arm 92 of a lever pivoted to a stud 93 on the left standard 11. This lever has a second arm 94 which engages one blade of the switch 88 through an insulating sleeve 95 thereon. The switch 88 is biased open and holds the arm 92 yieldably in engagement with the peripheral groove 91. As the leading edge of a sheet record passes the arm 92 in the latching of the record onto the drum 16, it cams the arm 92 outwardly to close the switch 88. Since a mounted sheet record fully envelops the drum, this switch 88 is retained in closed position so long as a record is on the drum 16. However, as the drum is reversed to feed the sheet record off of the same and through the slot 29, trailing edge first, the switch 88 is reopened as the leading edge of the sheet record passes the arm 92.

Figure 1:
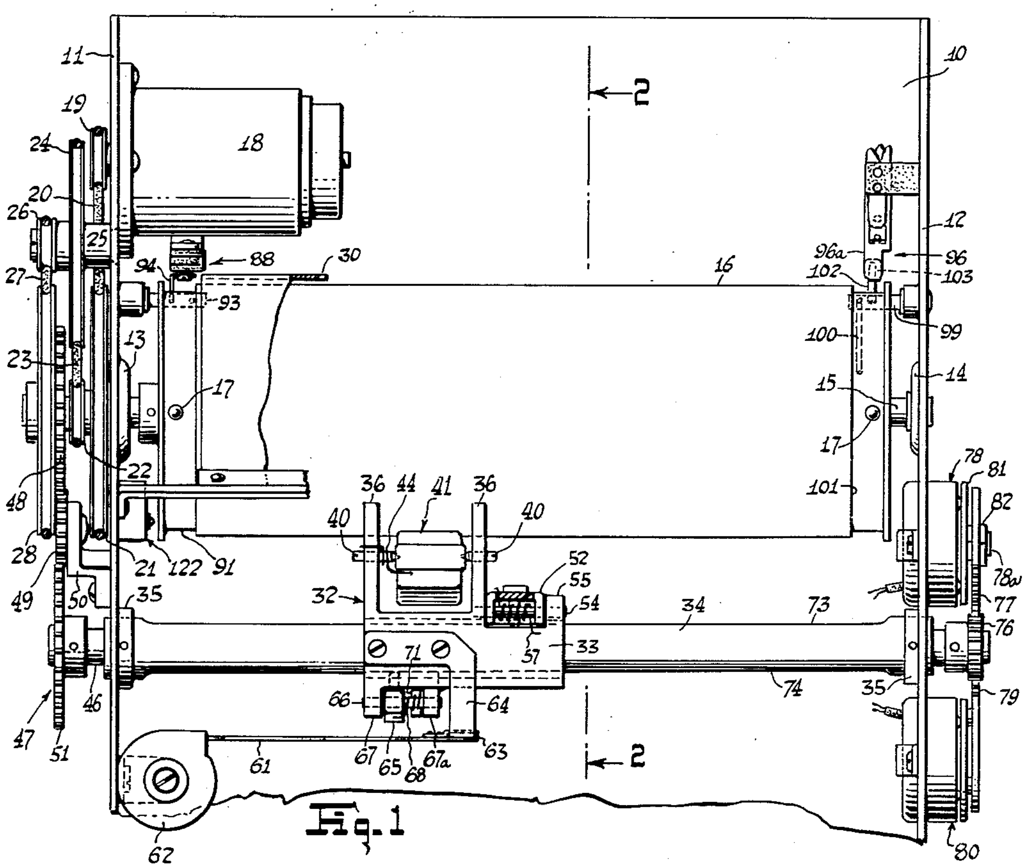
FIGURE 1 is a fractional plan view of a dictating machine adapted for operation according to our invention.

The solenoid 80 is controlled solely by a switch 96 which like the switch 88 is controlled also according to whether or not a sheet record is mounted on the drum 16. This is a single pole-double throw snap switch of the make-before-break type comprising three switch blades with a central pole member 96a mounted in an insulating stack 97 on the base 10. The pole member 96a has a central cantilever section struck therefrom and biased upwardly by an expansion spring 98 interposed between the free end of this switch section and the outer end of the pole member proper, which causes the switch 96 to make normally with the upper contact. The switch is operated to its lower contact by a lever pivoted on a stud 99 on the right side standard 12. This lever has a curved arm 100 engaging obliquely a peripheral groove 101 in the right end portion of the drum 16 (FIGURES 1 and 3) and a second arm 102 operable against an insulating button 103 on the pole member 96a of the switch. As the leading edge of a sheet record passes the arm 100 in the mounting of the record on the drum 16, the arm 100 is cammed outwardly to shift the pole member 96a upwardly and cause the central contact thereof to be shifted downwardly with momentary closure of the two outer switch blades. When a sheet is removed the pole member 96a is released to cause again a momentary closure of the two outer switch blades.

Figure 6:
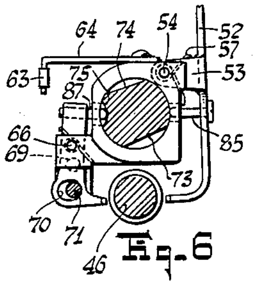
FIGURE 6 is a view similar to FIGURE 5 but showing the feed pawls operated for returning the carriage to its start position.
Figures 9, 10:
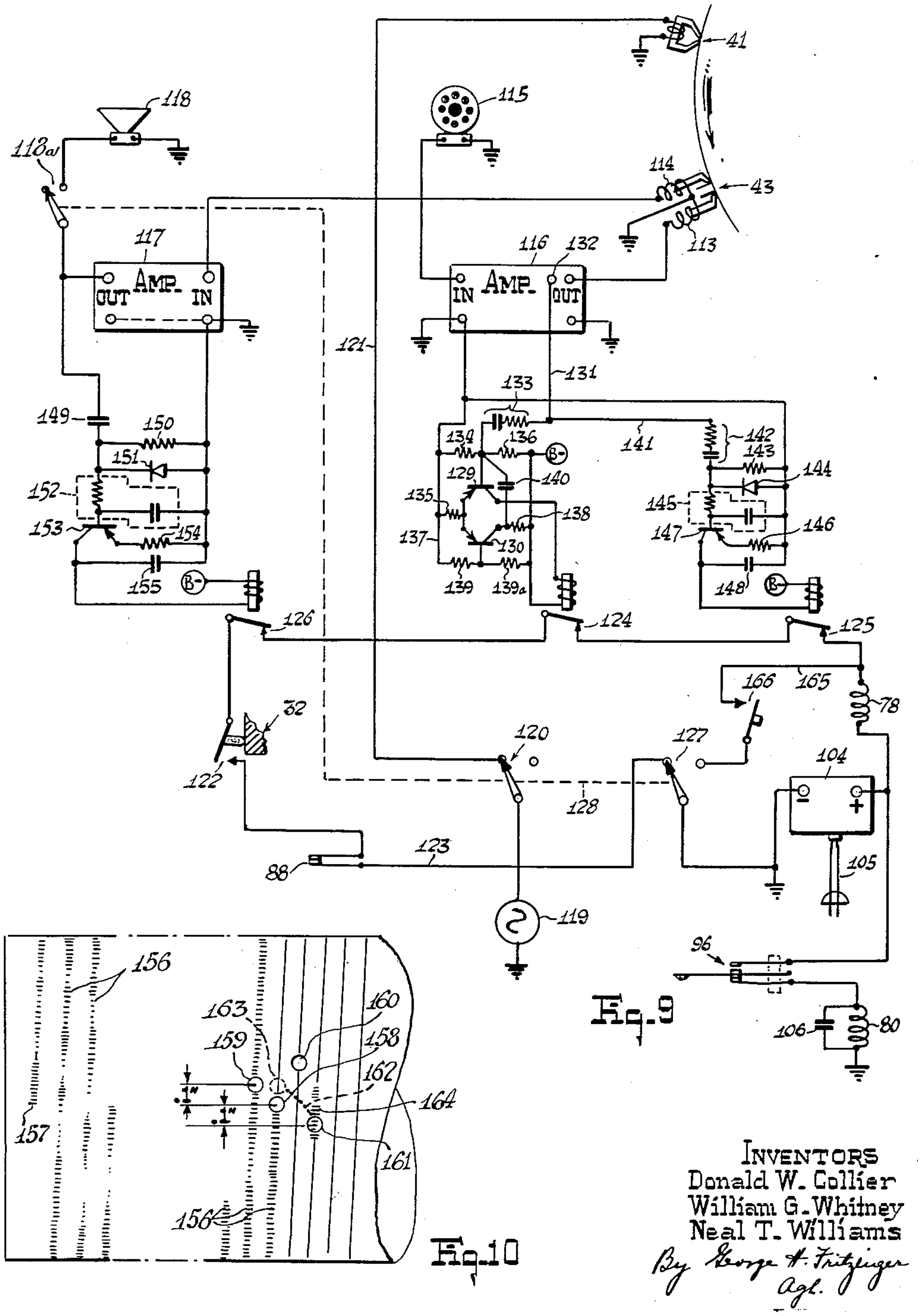
FIGURE 9 is a schematic circuit diagram of the control system of the present automatic machine.
FIGURE 10 is a plan view of a record drum visibly indicating the tracks thereon scanned by the record-reproduce heads for illustrating the timing of the control switches for the backspacing means with reference to the positioning of the heads on the record.

The solenoid 80 is connected between ground and the plus terminal or rectifier 104 through the switch 96, the rectifier being connected to a suitable power source through a power cord 105 as shown in FIGURE 9. Thus, the solenoid 80 is activated momentarily both during record mounting and record removal at the instant the leading or trailing edge of the record passes the arm 100. In order that such momentary activation of the solenoid 80 may hold it activated for a desired length of time to enable full return of the carriage 32, as will appear, a condenser 106 is connected across the coil of the solenoid. Activation of the solenoid 80 turns the rod 34 through a wider angle than that produced by the solenoid 78—which is made possible by the lost-motion coupling 82—82a which permits an overtravel of the gear 77 with respect to the solenoid 78—to bring the periphery of the rod in registration with the pin 85 whereby to release the feed pawl 52 from the feed screw 46 and at the same time to bring the cam slot 75 in registration with the pin 87 whereby to cause the stop pawl 65 to be also released from the feed screw 46 under influence of the bias spring 68 as shown in FIGURE 6. As soon as this condition occurs the carriage 32 is snapped backwardly to its start position by the return spring 61 to assure that recording will always start at the left end of the recordable range on a record after each change of record on the drum 16.

Figure 8:
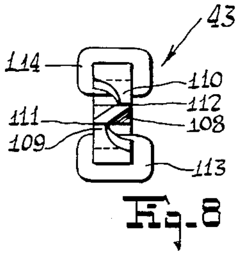
FIGURE 8 is an end view of this record-reproduce head as seen from the line 8—8 of FIGURE 7.
Figure 7:
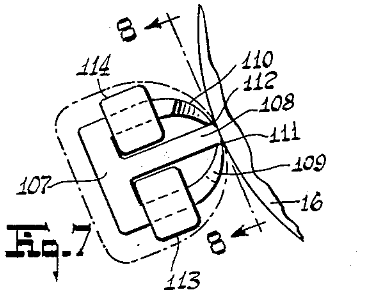
FIGURE 7 is an enlarged side elevational view of a combined record-reproduce head used in our invention, shown in contact with a record drum fractionally indicated.

The combination record-reproduce head has a magnetic core 107 provided with a central leg 108 cooperating with respective pole pieces 109 and 110 of the outer legs of the core to form recording and reproducing gaps 111 and 112. The pole piece 109 is cut away at its left side and the pole piece 110 at its right side, as shown in FIGURE 8, so that the recording gap will lead the reproducing gap by one full track convolution less the peripheral space on the record between the gaps. Encircling the outer legs of the core are respective recording and reproducing coils 113 and 114. Preferably, the central leg is provided also with oblique cutouts at its opposite sides, as shown in FIGURE 8, so that the end face thereof will be only as wide as the adjacent pole pieces at the respective gaps. Typically, each gap may be .018" wide and the distance between the gaps may be .012" for a track pitch of .030" on the record; and the space between the gaps peripherally of the record may be .1".

As shown by the schematic diagram in FIGURE 9, there is a dictator's microphone 115 connected to the input of a recording amplifier 116, the output of which is connected to the recording coil 113 of the combination head 43. Similarly, the reproducing coil 114 of this head is connected to the input of a reproducing amplifier 117 having its output connected to a speaker 118. Energizing current for the erase head 41 is supplied from a high frequency source 119 through a switch 120 and lead wire 121.

When a record is mounted on the drum 16 by inserting the same, leading edge first, through the guide slot 29 until the drive pins 17 engage the drive holes in the leading corners of the record, the record is carried about the drum to cause momentary closure of the switch 96 to operate the solenoid 80 and cause the carriage 32 to be returned to its start position. When the carriage 32 is in its start position it abuts against the operate button of a microswitch 122 on the left standard 11 to hold this switch open. For reasons which will be apparent, the switch is so designed that it does not close until the carriage has been advanced by the pitch of two full track convolutions on the record.

The carriage backstepping solenoid 78 has a control circuit 123 serially including the power source 104, the carriage start switch 122 just described, the record mounting switch 88 hereinbefore described, switches or respective voice-operated relays 124, 125 and 126, and a single-pole double-throw record-reproduce switch 127 hereinafter termed the RR switch. The pole and one contact of this RR switch are closed in the circuit 123 when the switch is in record position shown in FIGURE 9. As will be apparent, when the RR switch is in record position the backstepping relay 78 is controlled automatically by the voice signals being recorded as well as the voice signals being picked up from the record. By means of a mechanical coupling 128 between the RR switch 127, the erase control switch 120 and a switch 118a in the reproducer output circuit to the speaker 118, the erase head 41 is energized to remove any prior recording on the record in advance of the recording head and the speaker is disconnected whenever the RR switch is in record position.

The switches of the relays 124, 125 and 126 are normally closed. Switch 88 is also closed as whenever a record is mounted on the drum 16, but the mounting of a record on the drum will cause the carriage start switch 122 to be held open at the completion of the mounting operation. This initial open condition of the switch 122 prevents operation of the backstepping relay during advance of the carriage from start position through the pitch distance of two track convolutions on the record.

It is desired that the relay 124 be operated instantly to open position whenever any pulse or signal appears in the recording circuit, and that it be then held open for an interval of the order of 150 ms. regardless of the duration of such pulse or signal. For this purpose the relay is operated by a multivibrator circuit comprising, for instance, first and second transistors 129 and 130 which may be of the junction PNP type. Connection of this vibrator to the recording circuit is made through lead wires 131 running from an intermediate point 132 of the recording amplifier 116 where the output voltage is essentially independent of frequency. The connecting circuit includes an RC decoupling impedance 133 and a load resistance 134. Voltage from the load resistance is fed to the input of the transistor 129 through a common emitter resistor 135, and the collector of this transistor is connected directly through the coil of the relay 124 to B−. This first transistor 129 is normally cut off by a biasing network which holds the base suitably positive with respect to the emitter, this network being composed of resistors 134 and 136 connected between ground wire 137 and B−. However, the transistor 130, whose collector is connected through resistor 138 to B−, is held normally conductive by a bias network composed of resistors 139 and 139a connected between ground and B− and which hold the base suitably negative with respect to the respective emiter. When an impulse is fed to the transistor 129 of a magnitude sufficient to render the transistor conductive, the second transistor 130 is immediately cut off and in response thereto a regenerative voltage is fed back to the first transistor 129 through a coupling condenser 140 both to increase the collector output and to prolong the conductive condition of the first transistor. The prolongation period is determined by the time constant of the feedback circuit—i.e., the product of the condenser 140 and of the resistors 134 and 136 in parallel—and is set at approximately 150 ms. The resultant regenerated output pulse from the transistor 129 feeds through the coil of the relay 124 and operates it positively to open position the instant the input signal arrives and holds it operated for the 150 ms. interval regardless of whether the input signal has continuity or not.

Branching from the circuit 131 is a circiut 141 serially including a decoupling impedance 142 and a load resistor 143, and connected in parallel with this load resistor is a "Zener" diode 144 of the type which requires voltage in excess of a selected threshold to render it conductive. Following the diode is a time-delay RC newtork 145 which has a time constant of the order of 100 ms., and connected to the output of this network through an emitter resistor 146 are the base and emitter elements of a transistor 147. The collector of this transistor is connected to B— through the coil of the relay 125 and is connected also through a condenser 148 to ground, the purpose of the condenser being to provide a delayed drop-out of the relay for a period of the order of 3.1 seconds after a cessation of signals in the recording circuit.

As so far described it will be seen that any momentary impulse of a magnitude above a given threshold in the recording circuit will cause the relay 134 to be operated instantly to open position and to be then held for a duration of 150 ms. If the impulse or signal has continuity, then the relay 125 is also operated to open position within the time interval during which the relay 124 is being held open and once this latter relay is operated it will remain so throughout the time that signals are being fed in the recording circuit and then for a further duration of 3.1 seconds after a cessation of signals in that circuit. The 3.1-second dropout time for the relay 125 is chosen so as to be .1 second longer than the time required for one complete revolution of the drum 16.

The gap of the reproducing head—being about .1" less than one complete revolution behind that of the recording head—will start picking up recorded signals from the record after recordation has proceeded for about 2.95 seconds—the scanning time between the two heads—and will feed these signals into the reproducing amplifier 117. The output of this amplifier is connected not only to the speaker 118 but also through a blocking condenser 149 across a load resistor 150. Connected across the resistor 150 is another "Zener" diode 151 and also an RC time-delay network 152 having a time constant of the order of 100 ms. The output of this network is connected to the input of a transistor 153 through an emitter resistor 154. The collector of this transistor is connected directly through the coil of the relay 126 to B— and is also connected through a condenser 155 to ground to provide a delayed drop-out time for the relay of the order of approximately 3 seconds—the time of one drum revolution.

The operation of the machine may now be described particularly with reference to FIGURE 10 wherein the tracks which are scanned by the heads are indicated by lines 156. In the start position of the carriage the recording head will be at point 157. If the dictator does not immediately start speaking into the microphone to record dictation after the carriage has been returned to start position, the recording head will be advanced for two convolutions and then the carriage-end switch 122 will be closed to activate the backstepping solenoid 78 to restore the head again to its initial position. This operation will recur after each two revolutions of the drum until the dictator begins recording dictation.

When the dictator begins recording dictation, the relay 124 is immediately opened and before it can drop out the relay 125 is also moved to open position. After about one revolution of recording, the relay 126 will also be opened by the voice signals picked up by the reproducing head. As the carriage is advanced beyond the first two revolutions from its start position, the end switch 122 is closed but this has no immediate effect. Although the relay 124, being a multivibrator, will make and break during the recording of dictation, this also has now no effect because the relays 125 and 126 are now being held open. Interruptions in the dictator's recording up to 3 seconds—the time of one full drum revolution—also have no control effect because the relays 125 and 126 do not drop out within such time intervals.

If the dictator should discontinue recording, say at point 158, with the reproducing head being then at point 159, for more than 3.1 seconds, the following occurs: Relay 124 will have already dropped out as after 150 ms., in 2.95 seconds the reproducing head rides off of the recording track, and in 3.1 seconds the relay 125 drops out, this drop-out occurring when the recording head reaches the point 160. The backstepping solenoid is however not yet activated because the relay 126 is being held open by the 3-second drop-out time after the reproducing head rides off of the recording track. If the dictator does not resume recording dictation during that 3-second drop-out interval of the relay 126, the recording head will be advanced to the point 161 when the relay 126 drops out, and then this drop-out occurs—which is at 5.95 seconds after the dictator has stopped recording—the circuit 123 is closed to activate the backstepping solenoid 78. However, because of inertia of mechanical operating parts there will be a delay of the order of .1 second in the operation of the backstepping solenoid, and as a result the return of the recording head will be approximately along the dotted line 162 to place the recording head at a point 163 slightly in advance of its position 158 where the recordation had ended. Thus, so long as the dictator does not record for intervals of about two drum revolutions or more, the carriage is stepped back to about its original position approximately every 6 seconds with no resultant advance of the heads across the record.

If the dictator resumes recording after 3.1 seconds but less than 5.95 seconds—i.e., while the recording head is between the points 160 and 161 in Figure 10—the following will occur: The relay 124 and possibly also relay 125 will have been opened by the time the recording head reaches the point 161 of farthest advance with the result that a drop-out of the relay 126 at this point will not cause activation of the carriage backstepping means. Instead, advance of the carriage will continue onwardly past the point 161 for the duration of the resumed dictation.

If the instantly-operated relay 124 were not used, any start of signal feed into the recording circuit within 100 ms.—the operate time of relay 125—of the elapse of the 3 second drop-out time of the reproduce-control relay 126 would be ineffective in withholding the carriage 32 from being backstepped at the end of that drop-out time, and as a result any syllabi spoken prior to the carriage reaching its backstepped position would be effectively clipped from the recorded dictation on the record. However, any such signal which starts within 100 ms. of the 3 second drop-out time of the relay 126 must have a duration of 100 ms. or more in order to operate the relay 125 and cause the backstepping to be withheld at that time. For example, if such signal is merely an impulse of less than 100 ms. duration it serves only to postpone the backstepping of the carriage 32 by the dropout time of the relay 124, and in the continuing operation of the machine the impulse is erased. But if the resumed signal has more than 100 ms. duration as indicated at 164 in FIGURE 10, not only is the relay 124 operated at the first instant but the relay 125 is operated also about 100 ms. thereafter. Having been once operated, the relay 125 will hold the backstepping circuit 123 open for its drop-out time of 3.1 seconds running from the end of the signal impulse. But just prior to the expiration of the 3.1 second drop-out period—actually when 3.05 seconds have expired from the start of the signal impulse—the relay 126 is closed by pick-up by the reproducer head 114 of the signal impulse, and on elapse of 3 seconds (the drop-out time of the relay 126) from the time the reproducer head has passed the signal impulse 164, the relay 126 is closed to cause the carriage to be backstepped by two revolutions to place the recorder head 113 just in advance of the end of the recorded signal impulse, assuming of course that no further signal has been fed into the recording circuit in the meantime.

When the machine is to be used only for reproducing, the RR switch 127 is thrown to the right in its reproducing position. This breaks the circuit 123 and provides an alternative circuit 165 through a normally-open manual switch 166 for the backstepping solenoid 78. Thus, during the use of the machine for reproducing the operator may press the switch 166 one or more times into closed position, depending upon the amount of backstepping of the carriage 32 which is desired, to enable the pick-up of any selected prior recording on the record.

By the foregoing description it is seen that we provide an automatic recording and reproducing machine which requires no control other than that of changing the records on the machine. So long as recording is continued uninterrupted for no more than about the time of two drum revolutions, the carriage advance continues uninterrupted, but if recording is interrupted at any time for a period greater than that of two drum revolutions the carriage is stepped backwardly by the pitch distance of two revolutions to prevent needless waste of record space. Because of these automatic features it will be apparent that this machine is particularly well suited for remotely controlled dictation recording systems. However, no unnecessary limitation of the invention to the dictating machine field is intended.

Although the invention has particularly useful application in connection with machines wherein the record medium is of the magnetic type and in the form of a drum or sheet supported on a drum or other revolvable support, no unnecessary limitation thereto is intended since the invention is applicable as well to machines using other record media such as of a belt, web or disk form. Furthermore, the particular embodiment of our invention herein shown and described is intended in other respects as being illustrative and not necessarily limitative of the invention since the same is subject also to other changes and modifications without departure from the scope of our invention, which we endeavor to express according to the following claims.

We claim:

1. In a recording machine: the combination of a record medium; a recording head; a reproducing head; a carriage for supporting said heads in cooperative relation with the record medium with the reproducing head trailing the recording head; means for producing a relative movement between said record medium and said carriage to cause the heads to scan the record medium along successive side-by-side tracks; means for backspacing said carriage by the distance between an integral number of said tracks; a control circuit for said backspacing means serially including at least two switches normally in closed position; means responsive to signals fed to said recording head for opening one of said switches; and means responsive to signals picked up by said reproducing head for opening the other of said switches.

2. The combination set forth in claim 1 including means for delaying return of said one switch to closed position following a cessation of feed of signals to said recording head; and means for delaying return of the other of said switches to closed position following movement of said reproducing head onto an unrecorded area of the record medium.

3. The combination set forth in claim 2 wherein said reproducing head is positioned to trail behind said recording head by approximately one full track; and wherein the drop-out time of said switches is approximately the time required for scanning one full track.

4. The combination set forth in claim 2 including means for effecting automatic return of said carriage when a record medium is changed on said support; and means controlled by said carriage as the same is returned to start position for rendering said backspacing means inoperative until the carriage has undergone a predetermined advance from that position.

5. In a magnetic recording machine: the combination of a support for a magnetic record medium; a recording head; means for producing a continuous relative movement between said record medium and recording head tending to cause the head to be advanced continuously along successive side-by-side tracks on the record medium; means for feeding signals of interrupted character to said head for recordation thereby on the record medium; means for backspacing said recording head by the pitch distance of an integral number of said tracks; a recording circuit; a control circuit for said backspacing means including at least two switches normally in closed position; means responsive to an initial signal impulse fed into said recording circuit for opening one of said switches, said one switch having a predetermined drop-out time; and means responsive only to signals being fed into said recording circuit for a predetermined time duration less than the drop-out time of said first switch for opening the other of said switches.

6. The combination set forth in claim 5 including means for delaying the return of said other switch for approximately the time interval of scanning a single full track, including a reproducing head positioned to trail said recording head by approximately the scan time of a single full track; a third switch in said control circuit normally in closed position; means for shifting said third switch to open position responsive to signals picked up by said reproducing head; and means for delaying return of said third switch to closed position by approximately the scan time of a single full track.

7. In a recording machine: the combination of a record medium; a recording head; a reproducing head; a carriage for supporting said heads in cooperative relation with the record medium with the reproducing head trailing the recording head; means for producing a relative movement between said record medium and said carriage to cause the heads to scan the record medium along successive side-by-side tracks; means for backspacing said carriage by approximately the pitch distance between two successive tracks; a recording circuit; a control circuit for said backspacing means including at least three switches each normally in closed position; means responsive to an initial impulse in said recording circuit for opening one of said switches, said one switch having a dropout time of a minor fraction of a second; means responsive to a continuing signal in said recording circuit for a period less than the said drop-out time of said one switch for opening a second of said switches; means for causing said second switch to have a drop-out time greater than the scan time of a single full track by approximately said minor fraction of a second; a reproducing head positioned to trail said recording head by less than the scan time of a single full track; means responsive to a continuing signal picked up by said reproducing head for a period less than said drop-out time of said one switch for opening the third of said switches; and means for causing said third switch to have a drop-out time equal approximately to the scan time of a single full track.

8. The combination set forth in claim 7 including means for automatically returning said carriage to start position upon changing a record on said support; and means controlled by said carriage for rendering said backspacing means inoperative during the scanning of approximately the first two tracks by the recording head from start position.

9. In a recording machine: the combination of a record support; a recording head; means for causing said head to be advanced along successive side-by-side tracks on a supported record; means for backspacing said head; a reproducing head at a fixed trailing distance behind said recording head; and means controlled by recorded signals picked up by said reproducing head including means timed to activate said backspacing means to shift said recording head backwardly by a predetermined distance each time said reproducing head encounters an unrecorded track for a predetermined time interval.

References Cited in the file of this patent

UNITED STATES PATENTS

| | | |
|---|---|---|
| 2,553,410 | Handschin | May 15, 1951 |
| 2,816,177 | Logan | Dec. 10, 1957 |
| 2,822,426 | Dinsmore | Feb. 4, 1958 |
| 2,833,860 | Roberts et al. | May 6, 1958 |
| 2,833,866 | Esser | May 6, 1958 |